United States Patent [19]
Gimenez

[11] Patent Number: 5,921,615
[45] Date of Patent: Jul. 13, 1999

[54] DURABLE, OPEN, AND ACCESSIBLE RECREATIONAL VEHICLE SUBFLOOR CONSTRUCTION

[75] Inventor: J. Raul Gimenez, Riverside, Calif.

[73] Assignee: National R.V., Inc., Perris, Calif.

[21] Appl. No.: 08/921,097

[22] Filed: Aug. 29, 1997

[51] Int. Cl.[6] ....................................................... B60P 3/32
[52] U.S. Cl. .......................... 296/164; 296/204; 296/37.6; 296/37.1; 296/26.13; 280/783; 280/790
[58] Field of Search ..................................... 296/156, 164, 296/204, 37.1, 37.6, 26.13; 280/783, 790

[56] References Cited

U.S. PATENT DOCUMENTS

| | | |
|---|---|---|
| 2,639,187 | 5/1953 | Grumbache . |
| 2,741,492 | 4/1956 | McCaw . |
| 3,989,119 | 11/1976 | Cady . |
| 4,127,300 | 11/1978 | Melley et al. . |
| 4,159,844 | 7/1979 | Weiner ..................................... 296/37.1 |
| 4,728,144 | 3/1988 | Crean ....................................... 296/168 |
| 4,746,164 | 5/1988 | Crean . |
| 5,112,082 | 5/1992 | Clelland ................................... 280/783 |
| 5,314,205 | 5/1994 | Glesmann . |
| 5,342,106 | 8/1994 | Fisher ....................................... 296/204 |
| 5,501,504 | 3/1996 | Kunz . |

*Primary Examiner*—Joseph D. Pape
*Attorney, Agent, or Firm*—Oppenheimer Wolff & Donnelly LLP

[57] ABSTRACT

A recreational vehicle construction is constructed with a durable, open, and accessible subfloor, or subfloor frame assembly, placed between a skeletal chassis and the floor of the vehicle. The general structure of the subfloor includes a center portion and two outrigger assemblies on the flanks of the center portion. The subfloor frame assembly includes a pair of spaced basic beams secured to the underlying chassis, a plurality of upwardly extending spaced posts, and two overlying spaced apart center beams secured to the upper ends of said posts. The subfloor enhances overall stability and rigidity of the vehicle and increases storage space. The open and accessible design of the subfloor eases post-production installation of various components of the vehicle and also increases serviceability, thereby reducing production and service costs.

20 Claims, 4 Drawing Sheets

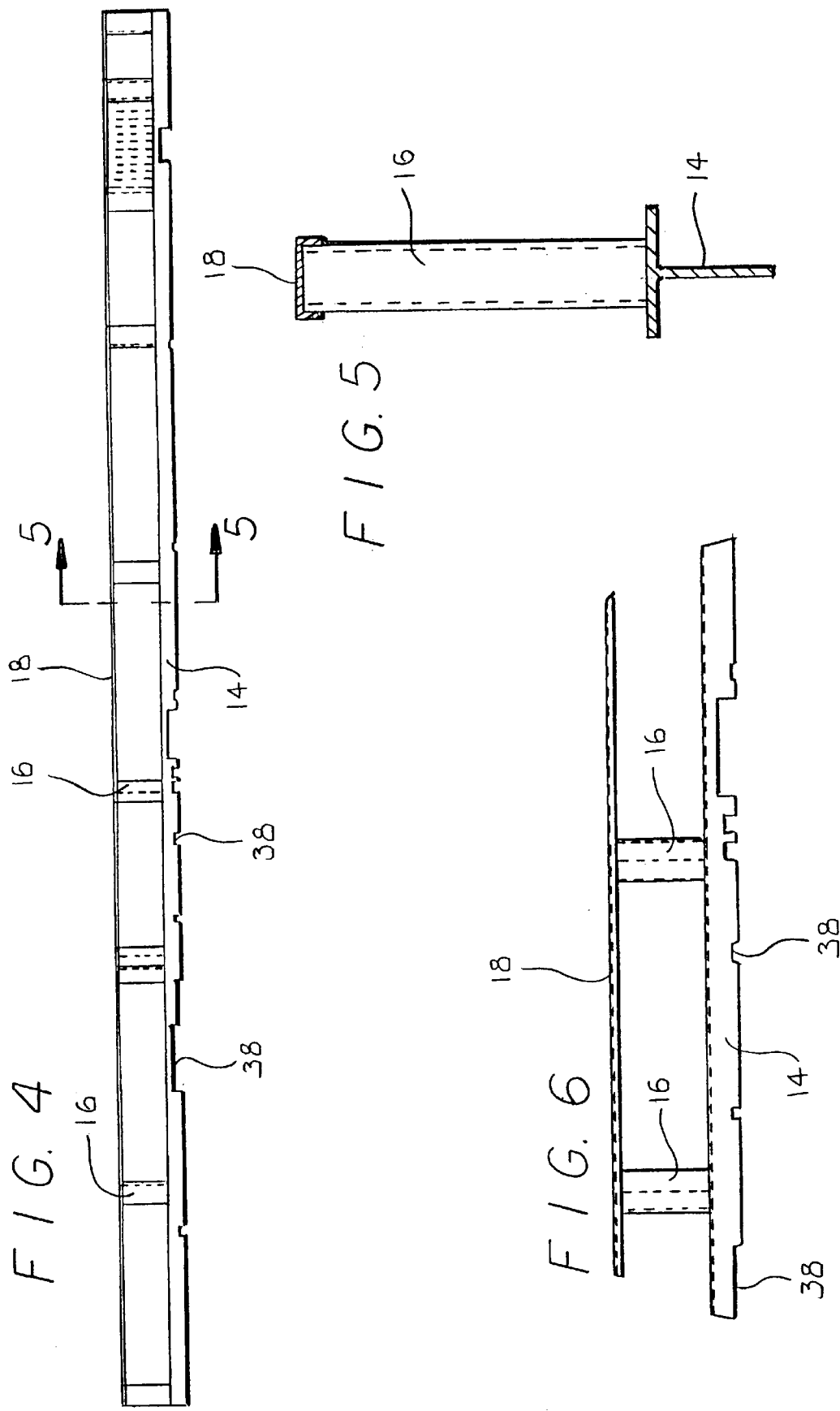

DURABLE, OPEN, AND ACCESSIBLE RECREATIONAL VEHICLE SUBFLOOR CONSTRUCTION

FIELD OF THE INVENTION

This invention relates generally to the construction of new and improved recreational vehicles and particularly to the construction of a durable, open, and accessible subfloor that is placed between the skeletal chassis and the floor of a recreational vehicle to improve the rigidity, accessibility, modularity, and storage capacity of the vehicle.

BACKGROUND OF THE INVENTION

Recreational vehicles are normally built using a "skeletal chassis" of a motor vehicle purchased from a vehicle manufacturer such as Ford, Chevrolet, or Freightliner. As used in this specification, the phrase "skeletal chassis" designates a structure that includes various mechanical components such as the motor, front and rear axles, control pedals, steering wheel and the like, as well as the chassis frame upon which the mechanical components and other items are mounted. However, a skeletal chassis does not include a subfloor or platform structure. Most commonly, the skeletal chassis includes two substantially parallel elongated members or beams that extend for substantially the length the chassis, and upon which the remainder of the recreational vehicle is mounted.

As used in this specification, the term "shell" generally refers to an enclosed structure which extends over the chassis in order to surround the usable space in a recreational vehicle. The skeletal chassis directly or indirectly supports the shell. The shell encloses both the driver compartment in the front portion of the vehicle where various operating controls for the vehicle are located, and the living area which extends from the front portion to the rear portion of the vehicle.

Concerning recreational vehicle structures which have been used heretofore, U.S. Pat. No. 5,314,205, issued to Glesmann, discloses a typical skeletal chassis. The chassis includes two parallel elongated members that extend for substantially the length of the chassis. The elongated members are referred to as chassis rails. These chassis rails are normally constructed with steel beams having a channel-shaped cross-section. The chassis rails are spaced apart, with the length of the rails being dependent upon the variations in the wheel bases of different recreational vehicle. In the direct-chassis-support construction, the shell of the recreational vehicle is mounted directly on the chassis. The twin rails construction provides a desirable flat, long, and straight surface to mount the floor of a recreational vehicle. However, the twin rails construction may not be sufficiently sturdy to protect against bending and twisting forces encountered when the vehicle is driven on the road with pot holes and other irregular surfaces which are often encountered. Furthermore, the bending and twisting forces transfer from the chassis to the shell, and severe shocks may cause the side walls of the shell to crack and fracture. In addition, the direct-chassis-support construction does not provide sufficient accessible storage space for users. It also provides only a limited amount of holding compartments for various functional tanks or vessels (water, propane, holding). Thus, the direct-chassis-support construction method provides only limited solutions to the problem of positioning the tanks and vessels to achieve a balancing weight distribution and, at the same time, maintain accessibility for easy service.

U.S. Pat. No. 4,746,164, issued to Crean, discloses an indirect-chassis-support recreational vehicle construction where a platform is placed between the skeletal chassis and the floor of the vehicle. The Crean construction improves the stability of the recreational vehicle by providing a flat horizontal surface on which to mount the shell. It also increases storage compartments in the space between the skeletal chassis and the floor of the recreational vehicle. However, the storage compartments are not completely accessible from side to side. The lack of accessibility decreases serviceability and thereby increases service costs. Furthermore, the Crean storage compartments are not modular. Thus, the Crean design provides only limited ways to place storage space modules and functional units to balance the weight of the vehicle.

U.S. Pat. No. 5,501,504, issued to Kunz, discloses an improved indirect-chassis support recreational vehicle construction. The Kunz patent proposes placing a superstructure platform between the skeletal chassis and the floor of the vehicle. However, the Kunz platform uses a twin rails construction which, as noted above, does not provide adequate support to protect against bending and twisting forces. Also, the Kunz twin rails are long solid rails which substantially increase the weight of the recreational vehicle. The substantial added weight decreases the gas mileage of the vehicle and thereby increases its operating costs. The Kunz superstructure platform elevates the floor of the recreational vehicle and thereby increases the amount of storage space for users and holding compartments for functional units. However, the added storage space in the Kunz platform, particularly the space between the two platform rails, are not completely accessible. The lack of accessibility decreases serviceability and thereby increases service costs.

SUMMARY OF THE INVENTION

The present invention pertains to the construction of new and improved recreational vehicles and, in particular, to the construction of an open, durable, and accessible subfloor that is placed between the skeletal chassis and the floor of the recreational vehicle to improve the rigidity, accessibility, modularity, and storage capacity of the vehicle. A subfloor for a recreational vehicle in accordance with one exemplary embodiment of the present invention includes, among other elements, a pair of basic structural beams for mounting on a recreational vehicle skeletal chassis, a plurality of posts mounted on the structural beams, a pair of spaced-apart inner or center beams mounted on the posts, a plurality of outrigger plates secured to the posts and perpendicular to the center beams, and a pair of side beams secured to the upper outside corners of and perpendicular to the outrigger plates to form two flanking outrigger assemblies, including a series of storage spaces between the successive outrigger plates.

The present invention satisfies the needs set forth in the preceding discussion by placing an open, durable, and accessible subfloor between the skeletal chassis and the floor of the recreational vehicle. The novel subfloor enhances the stability of the vehicle by providing a better framework or platform on which to construct the floor of the vehicle. It also improves the rigidity of the skeletal chassis and thus provides better structural support for the vehicle. The subfloor also increases the storage space for personal goods and items, luggage, and functional units, as well as the accessibility of such storage space. Furthermore, the modular and accessible design of the subfloor eases post-production installation of components, increases serviceability and thereby reduces production and service costs.

Another significant advantage of the present invention is that it provides better structural support for the shell of the recreational vehicle. The open longitudinal structural beams strengthen the skeletal chassis, enabling the chassis to better withstand the bending and twisting dynamic forces encountered when the vehicle is driven on the road. The strengthened skeletal chassis provides better structural support for the shell. As a result, the shell is less likely to crack or fracture.

Another advantage of the present invention is that it increases storage space. The novel subfloor elevates the floor of the recreational vehicle to create additional storage space. Furthermore, the subfloor has flanking outriggers that provide even more storage space. The added space can be used either as additional user storage space for miscellaneous personal goods and items or as additional holding compartments for various functional tanks and vessels. The open structure of the subfloor allows for easy and modular installation of storage bins as well as functional units such as generators, water tanks, propane tanks, or holding tanks. Ease of installation reduces production costs. Modularity allows builders to evenly distribute the weight of the components of the vehicle and build a vehicle that is balanced and stable and, at the same time, accessible and serviceable. Furthermore, the open structure of the subfloor allows for complete side to side access to designated storage areas and thus increases accessibility of the functional units. Increased accessibility improves serviceability and thereby lowers service costs.

An additional advantage of the present invention is that the novel subfloor is constructed using rigid and durable material in a high strength, low weight configuration. Therefore, the current novel subfloor is lighter than the platforms disclosed in the prior art. The lighter current subfloor results in a significantly lighter vehicle that has better gas mileage and is cheaper to operate.

An additional unique feature of the present invention is pass-through storage capability. In the current novel subfloor, each outrigger plate has a knockout section that can be collectively removed to allow for longitudinal storage of extremely long items such as beach umbrellas or fishing poles. Thus, these long items can be stored in the current subfloor and not inside the living area or tied to the outside shell. The knock-out sections also allow for wiring on mechanical devices to extend longitudinally through the subfloor structure.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 3-A is an enlarged showing of one corner of the structure of FIG. 3;

FIG. 4 shows a side view of the subfloor, taken along line 4—4 of FIG. 3;

FIG. 5 shows a partial cross-sectional view taken at line 5—5 of FIG. 4;

FIG. 6 shows a enlarged partial side view of the subfloor shown in FIG. 4;

DETAILED DESCRIPTION OF THE PREFERRED EMBODIMENTS

The present invention pertains to the construction of new and improved recreational vehicles and, in particular, to the construction of an open, durable, and accessible subfloor that is mounted between the skeletal chassis and the floor of the recreational vehicle to improve the rigidity, accessibility, modularity, and storage capacity of the vehicle. The following description is provided to enable any person skilled in the art to make and use the invention and to set forth the best modes contemplated by the inventor for carrying out the invention. This description is not to be taken in a limiting sense, but is made merely for the purpose of illustrating the general principles of the invention.

Figure 1:
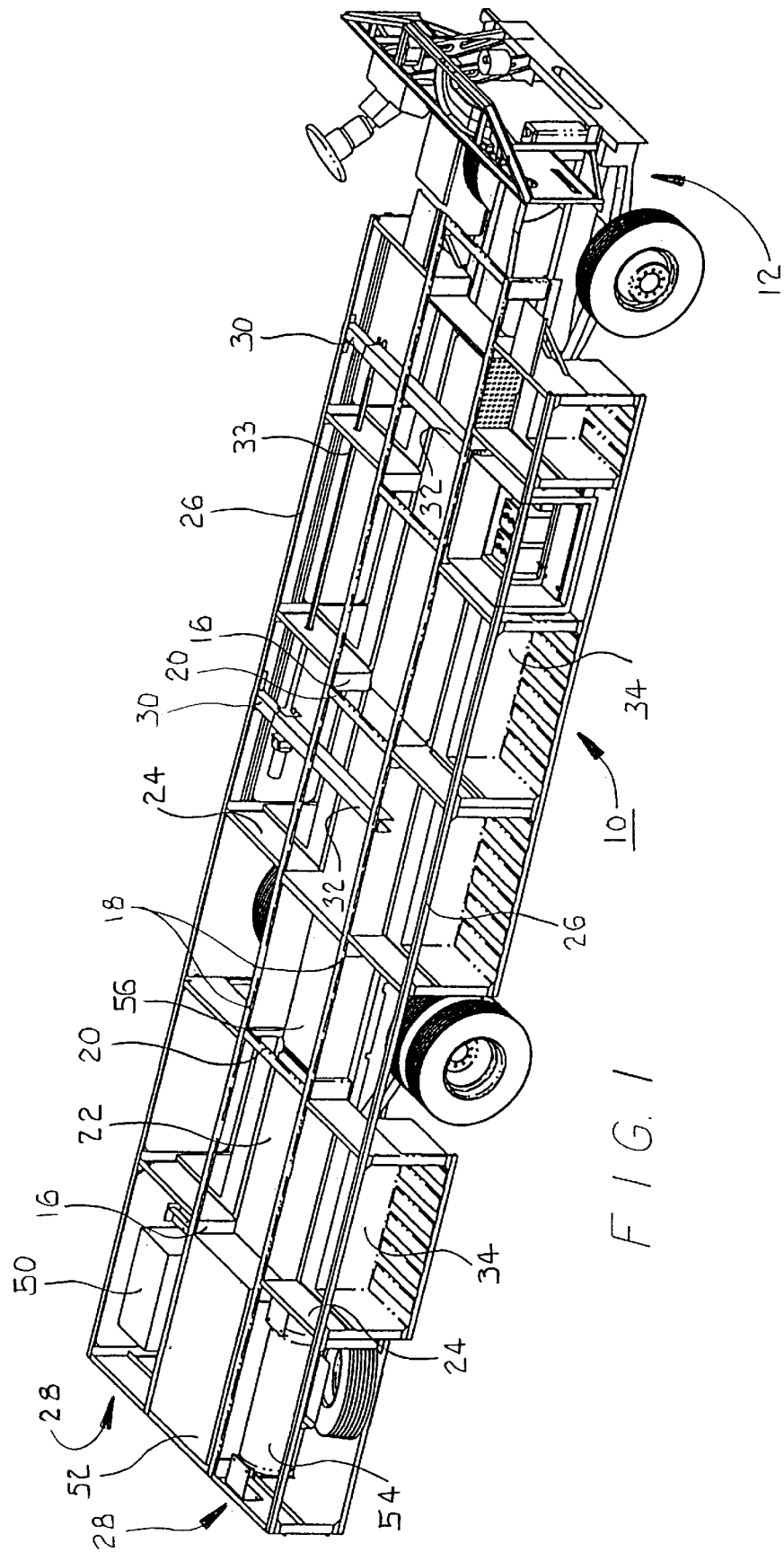
FIG. 1 shows a perspective view of the recreational vehicle without the shell in accordance with one embodiment of the present invention.
Figure 3A:
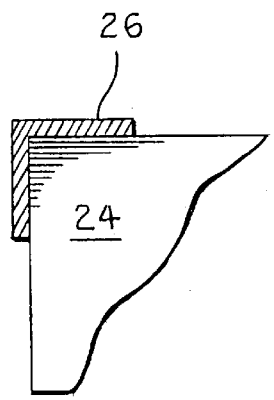
FIG. 3 shows a rear view of the recreational vehicle without the shell shown in FIG. 2.
Figure 3:
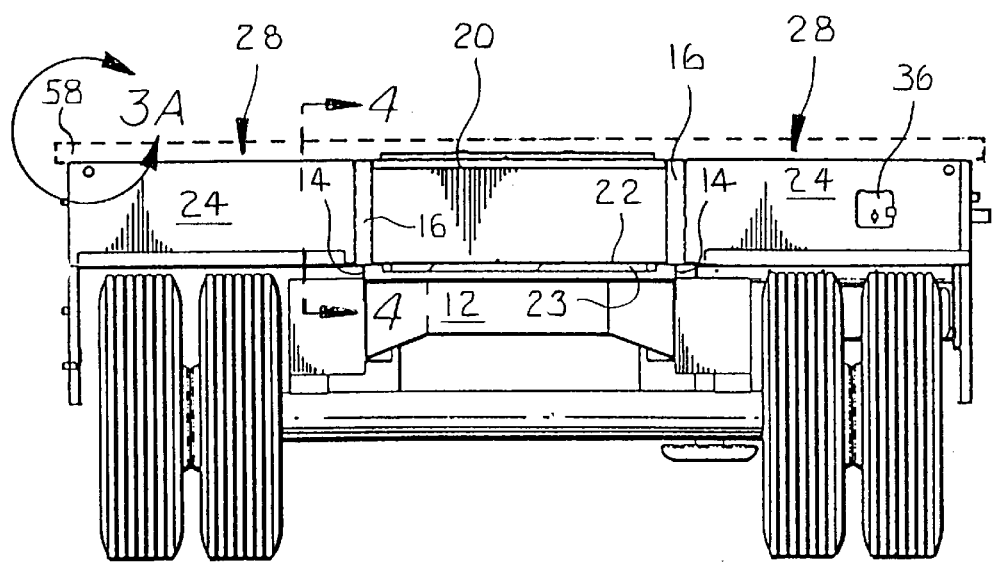
Figure 8:
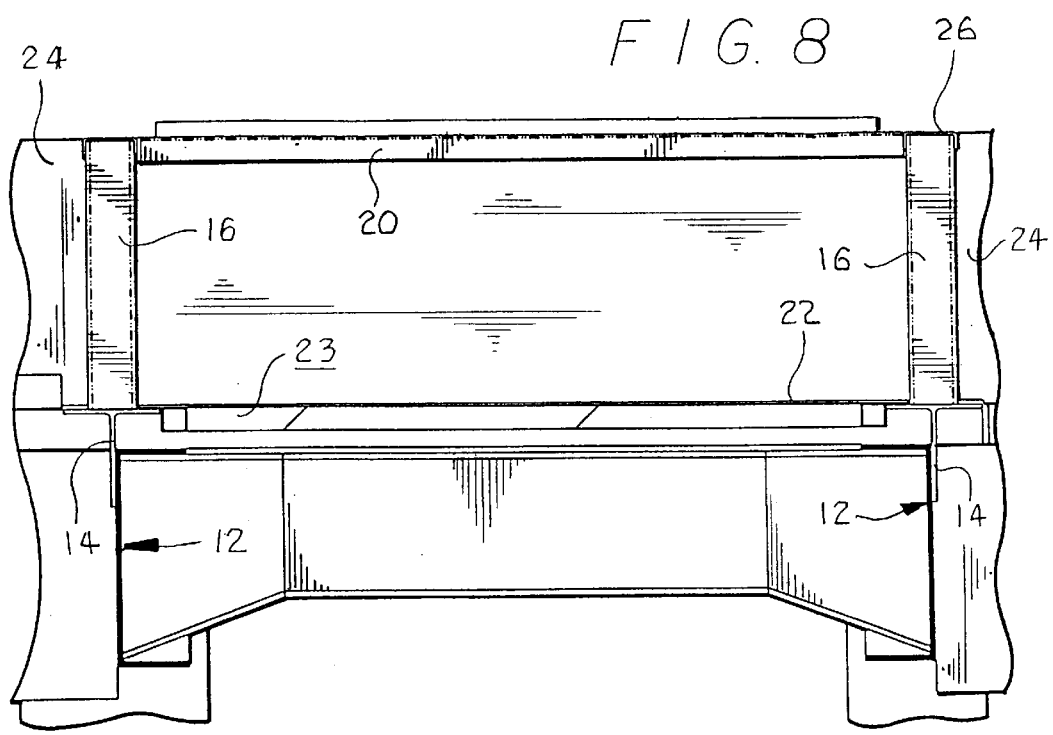
FIG. 8 is an enlarged showing of the relationship of the subfloor and the vehicle chassis rails.

As illustrated for example in FIGS. 1, 3, 4, 5, 6, and 8, a recreational vehicle in accordance with one embodiment of the present invention includes a skeletal chassis 12 and a subfloor frame assembly 10. The subfloor 10 is mounted on the skeletal chassis 12 using a pair of rigid structural beams 14 (shown in FIGS. 3 and 8). A series of posts 16 are mounted on and secured to the rigid structural beams. As shown in FIG. 4 and FIG. 6, each structural beam 14 has chassis notches 38 that are cut out to fit over the skeletal chassis 12. In the preferred embodiment, the posts 16 are box-like columns that may be approximately one foot high and may have cross-sectional dimensions of about two inches by five inches. The posts 16 raise the floor 58 of the recreational vehicle and create usable space between the skeletal chassis 12 and the floor 58. As shown in FIGS. 3, 5, and 8, each structural beam 14 may have a "T" cross-section. A center floor 22 is mounted on the upper flat portions of the T-shaped structural beams 14. The center floor 22 is mounted between the posts and extends for substantially the length of the vehicle. As shown to advantage in FIG. 8, the floor 22 may be strengthened by the addition of the underlying steel tubular members 23. As shown in FIGS. 1, 3, and 8, a pair of C-shaped center beams 18 are mounted on the hollow, box-like posts 16. As shown in FIGS. 1, 4, 5 and 8, the C-shaped center beams 18 are firmly secured to (by welding or by bolts, for example) and extend over the posts 16. FIGS. 1 and 4 show that the center beams extend for substantially the length of the recreational vehicle. In the preferred embodiment, the C-shaped center beams 18 are approximately twenty seven feet long. The C-shaped beams 18 are placed substantially in parallel and may be spaced about three feet apart. A series of structural cross beams 20 are laterally secured to the C-shaped beams 18 at locations where the posts 16 support the C-shape beams 18. The structural cross beams 20 strengthen the structure of the subfloor 10 and protect it against bending and twisting forces.

The structural beams 14, the hollow, box-like posts 16, the C-shaped center beams 18, the structural cross beams 20, and the center floor 22 are fastened together to form a durable, open, and accessible subfloor center portion that extends for substantially the length of the vehicle. The accessibility of the subfloor center portion allows for easy and modular post-production installation of functional units such as the generator 50, water tanks 52, propane tanks 54, and holding tanks 56. Ease of installation and modularity reduce production costs. Accessibility also improves serviceability and thereby reduces service costs. Furthermore, the subfloor center portion provides a light yet rigid and durable structural foundation for the subfloor 10, enabling the subfloor 10 (as well as the recreational vehicle shell mounted on the subfloor) to better withstand bending and twisting forces encountered on the road. The lightness of the subfloor center portion reduces the overall weight of the recreational vehicle, thereby increasing the gas mileage of the vehicle and reducing its operating costs, while allowing increased weight carrying capability.

The subfloor 10 includes two outrigger assemblies 28 on the flanks of the subfloor center portion. A number of rectangular metal outrigger plates 24 are aligned with the hollow, box-like posts 16 and extend away from the C-shaped center beams 18 toward the sides of the recreational vehicle. The metal outriggers plates 24 provide rigid structural support and protect the outrigger assemblies 28 against bending and twisting forces. A pair of L-shaped side beams 26 extend for substantially the entire length of the recreational vehicle. The L-shaped side beams 26 are secured to the upper outer corners of the outrigger plates 24 to form open outriggers that are completely accessible from the sides of the recreational vehicle. Storage bins 34, which extend below the level of the central floor 22, can be affixed to the outrigger assemblies 28 to create additional storage space for personal goods and items. The complete accessibility of the outrigger assemblies 28 from the sides of the recreational vehicle allows for easy post-production installation of components of the vehicle, such as storage bins 34, generators 50, water tanks 52, propane tanks 54, and holding tanks 56. The ease of post-production installation of components of the recreational vehicle decreases production costs. The accessibility of the outriggers 28 also improves serviceability and thereby reduces service costs. The open and modular design of the outriggers 28 allows builders of the vehicle to strategically place modular storage bins 34 or function units at various locations within the volume of the subfloor 10 to balance the weight of the recreational vehicle and, at the same time, maintain accessibility for easy service.

The current novel subfloor 10 also supports an extendible side of the vehicle. To supper the extendible side, a pair of elongated beams 32 are mounted laterally across the C-shape beams 18 to hold and guide a pair of movable structural supports 30. Also, a rotatable drive shaft 33 couples a motor power take off through appropriate gearing to shift the position of the movable structural supports 30.

Figure 2:
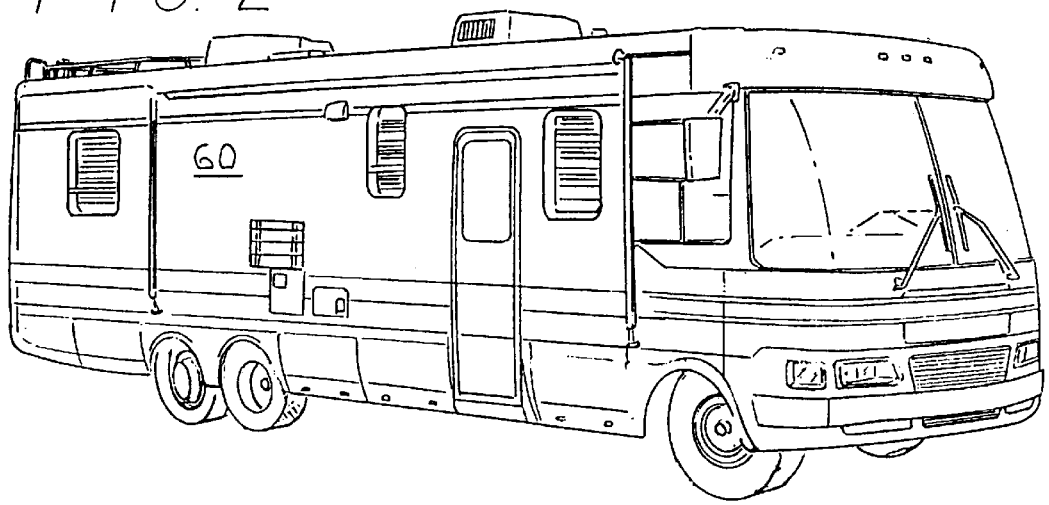
FIG. 2 shows a perspective view of a completely assembled recreational vehicle in accordance with one embodiment of the present invention.

As shown by way of example in FIG. 2, the recreational vehicle includes a shell 60 mounted above the subfloor so as to enclose the complete interior of the vehicle.

As noted above and illustrated for example in FIGS. 3 and 8, a pair of rigid structural beams 14 secure the exemplary subfloor 10 to the skeletal chassis 12. The structural beams 14 extend for substantially the length of the recreational vehicle (as shown in FIG. 1). Each structural beam 14 has a flat upper surface. A center floor 22 is mounted on the flat T-sections of the structural beams 14, extending for substantially the length of the vehicle. A plurality of hollow, box-like posts 16 are also mounted on the flat T-section of the structural beams 14. In the preferred embodiment, each hollow, box-like post 16 is a two by five column with a height of about one foot. A pair of C-shaped beams 20 are mounted on the hollow, box-like posts. The C-shaped center beams 18 are firmly secured over the posts. A plurality of structural cross beams 20 are fastened across the C-shaped beams 18 at locations where the posts 16 support the C-shape beams 18. The structural cross beams 20 provide additional structural support for the subfloor 10.

The exemplary subfloor 10 has two flanking outrigger assemblies 28 formed by a plurality of outrigger plates 24 and L-shaped side beams 26. A plurality of outrigger plates 24 are aligned with the hollow, box-like posts 16 and extend away from the C-shaped beams 18 toward the sides of the recreational vehicle. A pair of L-shaped side beams 26 are secured to the upper outer corners of the outrigger plates 24 to form flanking outrigger assemblies 28. The outrigger plates 24 provide structural support for the outrigger assemblies 28, enabling the outrigger assemblies 28 to withstand bending and twisting forces.

A floor 58 for the recreational vehicle is installed on top the durable, open, and accessible subfloor 10. The vehicle floor 58 can be secured to the box-like posts 16, the C-shaped beams 18, the structural cross beams 20, the outrigger plates 24, or the L-shaped side beams 26. In the preferred embodiment, the floor of the recreational vehicle 58 is insulated to dampen road noise and vibration.

Figure 7:
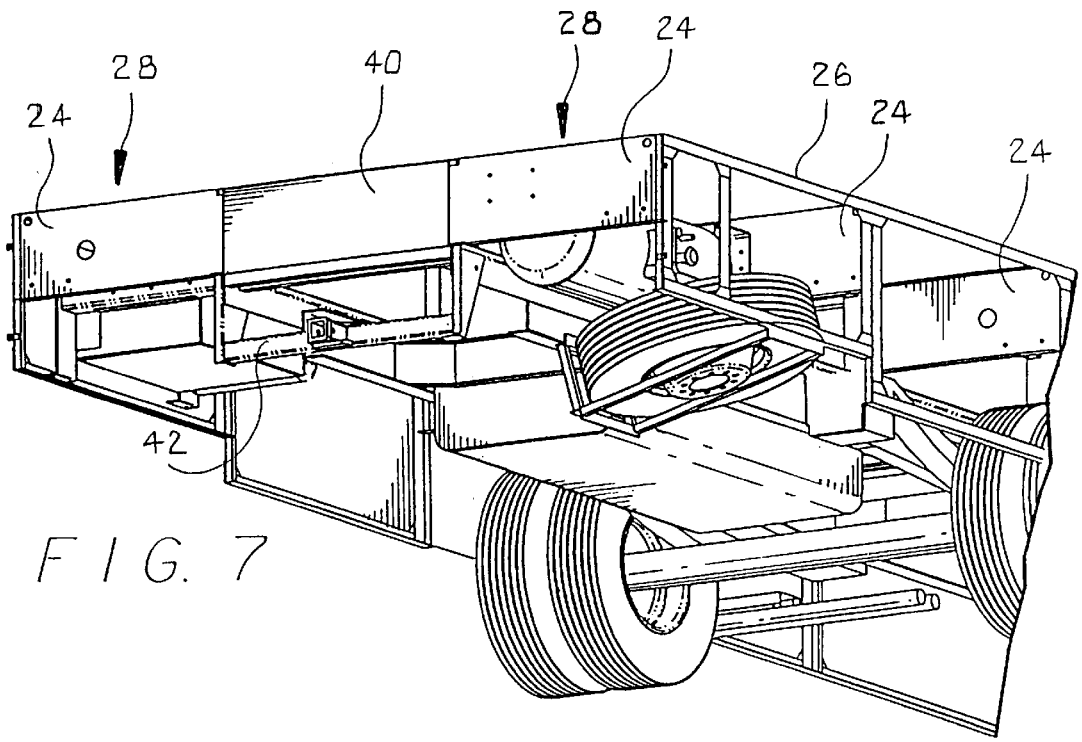
FIG. 7 shows a partial elevational perspective view of the rear of the recreational vehicle without the shell.

Referring to FIG. 7, a pair of L-shaped beams 26 are fastened to the outside upper corner of the outrigger plates 24 to form a flanking outrigger assembly 28 in the exemplary embodiment. A trailer hitch 42 is secured to the underside of the rear center panel 40. An optional trailer can be attached to the trailer hitch 42 to transport additional items such as animals, boats, motorcycles, etc. The trailer hitch 42 also serves as a structural cross member, providing additional structural support for the subfloor.

In the preferred embodiment, the C-shaped beams 18 are constructed using $3/16$ inch thick steel beams. The box-like posts 16 are formed of $1/4$ inch thick steel. The outrigger plates 24 are $1/8$ inch thick steel plates. The L-shaped beams 26 are constructed using $5/32$ inch steel and are approximately two inches wide and one inch high. The T-shaped beams 14 are constructed using either $3/16$ or $1/4$ inch thick steel. The flat portion of the T-beam is three inches wide. The T-shaped structural steel beams 14 are approximately $4\frac{1}{2}$ inches high. The length of the subfloor frame 10 will vary with the desired size of the recreational vehicle, but might typically be between 20 and 30 feet in length.

Although the present invention has been described in terms of the preferred embodiment above, numerous modifications and/or additions to the above-described preferred embodiments would be readily apparent to one skilled in the art. Thus, by way of example and not of limitation, the structural beams, side beams, center beams, and posts could have different shapes and dimensions. Thus, for specific example, the posts are preferably about one foot in height but could be from about eight inches to about eighteen inches, or slightly more or less depending on the size of the recreational vehicle and other desired performance and storage characteristics. It is further noted that, in the preferred embodiment, the subfloor construction is framed of steel, with the beams, posts, and other parts being welded together. However, other materials such as aluminum could be employed, and the parts may be secured together by bolts, by high strength glue or other known securing means. Accordingly, the present invention is not limited to the specific embodiment illustrated and described hereinabove.

What is claimed is:

1. A recreational vehicle, comprising:
   a chassis;
   a subfloor assembly mounted on said chassis, said subfloor assembly including:
   (a) a pair of spaced-apart rigid structural beams having a T-cross section extending for substantially the entire length of said recreational vehicle;

(b) a series of hollow, box-like posts mounted on and secured to said structural beams, said posts having a height of about eight inches to eighteen inches;

(c) a pair of C-shaped beams mounted on and extending over and firmly secured to said posts, said C-shaped beams extending for substantially the entire length of said recreational vehicle;

(d) a plurality of generally rectangular outrigger plates aligned with said posts and extending from said posts outward toward the outer sides of said recreational vehicle;

(e) a pair of L-shaped beams secured to the upper outer corners of said outrigger plates and extending for substantially the entire length of said recreational vehicle;

the entire volume of said subfloor assembly being substantially open and accessible from the sides of said vehicle; and recreational vehicle living quarters mounted on said subfloor assembly.

2. A recreational vehicle as defined in claim 1 wherein additional structural beams extend across between said two C-shaped beams at locations where said C-shaped beams are supported by said posts.

3. A recreational vehicle as defined in claim 1 further comprising a propane tank, a water tank, and a toilet fluid holding tank mounted in said recreational vehicle within the volume of said subfloor assembly.

4. A recreational vehicle as defined in claim 1 wherein said subfloor assembly includes said structural beams and said C-shaped beams extend to the rear of said recreational vehicle beyond said chassis.

5. A recreational vehicle as defined in claim 1 further comprising a central floor of sheet metal extending across the central area of said subfloor assembly between said posts.

6. A recreational vehicle as defined in claim 1 wherein said two C-shaped beams are spaced apart by at least three feet.

7. A recreational vehicle as defined in claim 1 further comprising a pair of movable structural supports for lateral extension from said recreational vehicle, said supports being mounted in elongated guides extending substantially perpendicular to said C-shaped beams, and said guides being fixedly secured to said C-shaped beams.

8. A recreational vehicle as defined in claim 7 further comprising a rotatable drive shaft mounted in the volume of the subfloor and mechanically coupled to said movable structural supports for extending a side of the recreational vehicle laterally.

9. A subfloor for a recreational vehicle, the recreational vehicle defining an overall vehicle length and including a chassis having a front end and a rear end, the subfloor comprising:

a driver-side structural beam and a passenger-side structural beam for mounting on the chassis, the structural beams extending for substantially the entire overall length of the recreational vehicle;

a plurality of posts mounted on the structural beams at intervals along the length of the structural beams;

a driver-side center beam and a passenger-side center beam mounted on the posts, the center beams extending for substantially the entire overall length of the recreational vehicle;

a plurality of outrigger plates secured to the posts and perpendicular to the center beams, the outrigger plates extend away from the center beams; and a driver-side side beam and a passenger-side side beam secured to the upper outside corner of and perpendicular to the outrigger plates, the side beams extending for substantially the entire length of the recreational vehicle.

10. A subfloor claim 9 further comprising a pair of movable lateral supports for lateral extension from the recreational vehicle, the lateral supports being mounted in elongated guides extending substantially perpendicular to the center beams, and the elongated guides being fixedly secured to the center beams.

11. A subfloor as defined in claim 10 further comprising a rotatable drive shaft mounted in the volume of the subfloor and mechanically coupled to said movable structural supports for extending a side of the recreational vehicle laterally.

12. A subfloor as defined in claim 9 wherein the upright posts are hollow.

13. A subfloor as defined in claim 9 further comprising a plurality of cross beams laterally secured to the center beams at intervals along said center beams.

14. A subfloor as defined in claim 9 whereby the volume of said subfloor is open and accessible from the sides of the recreational vehicle.

15. A subfloor as defined in claim 9 further comprising a propane tank, a water tank, and a toilet fluid holding tank mounted in the volume of the subfloor.

16. A subfloor frame for a recreational vehicle, the recreational vehicle defining an overall vehicle length and including a chassis having a front end and a rear end, and the subfloor frame overlying the chassis, the subfloor frame comprising:

a first structural beam and a second structural beam for mounting on the chassis, the structural beams extending for substantially the length of the subfloor frame;

a plurality of posts mounted on the structural beams at intervals along the length of the structural beams; and a first center beam and a second center beam spaced apart from the first center beam, the center beams being mounted on the posts and extending for substantially the length of the subfloor frame.

17. A subfloor frame as defined in claim 16 further comprising a plurality of outrigger plates secured to the posts, the plates extending away from said the beams.

18. A subfloor frame as defined in claim 17 further comprising a first side beam and a second beam secured to the outrigger plates, the side beams extending at least to the rear end of the chassis.

19. A subfloor frame as defined in claim 16 whereby the volume of the subfloor is open and accessible from the sides of the recreational vehicle.

20. A subfloor frame as defined in claim 16 further comprising a trailer hitch secured to the main beams of the subfloor frame.

* * * * *